United States Patent [19]

Winn et al.

[11] 3,775,614
[45] Nov. 27, 1973

[54] THERMOLUMINESCENT RADIATION DETECTOR

[76] Inventors: Ray Winn, 33 Elm Street, Wakefield, Mass. 01880; Joseph C. Ennis, 57 Topsfield Road, Ipswich, Mass. 01938

[22] Filed: Dec. 14, 1970

[21] Appl. No.: 97,685

[52] U.S. Cl. ............................................. 250/71 R
[51] Int. Cl. ................................................ G01t 1/11
[58] Field of Search ...................... 250/71 R, 71.5 R

[56] References Cited
UNITED STATES PATENTS

| | | | |
|---|---|---|---|
| 3,376,416 | 4/1968 | Rutland et al. | 250/71 R X |
| 3,419,720 | 12/1968 | Debye et al. | 250/71 R X |
| 3,555,277 | 1/1971 | Attix | 250/71 R |
| 3,590,245 | 6/1971 | Oonishi et al. | 250/71 R |

*Primary Examiner*—William F. Lindquist
*Assistant Examiner*—Davis L. Willis
*Attorney*—J. Herman Yount, Jr. and Robert B. Sundheim

[57] ABSTRACT

Radiation detector having a spring clip holding hot-pressed thermoluminescent chips in contact with a heater element welded to electrical leads passing through a glass envelope enclosing the same.

16 Claims, 7 Drawing Figures

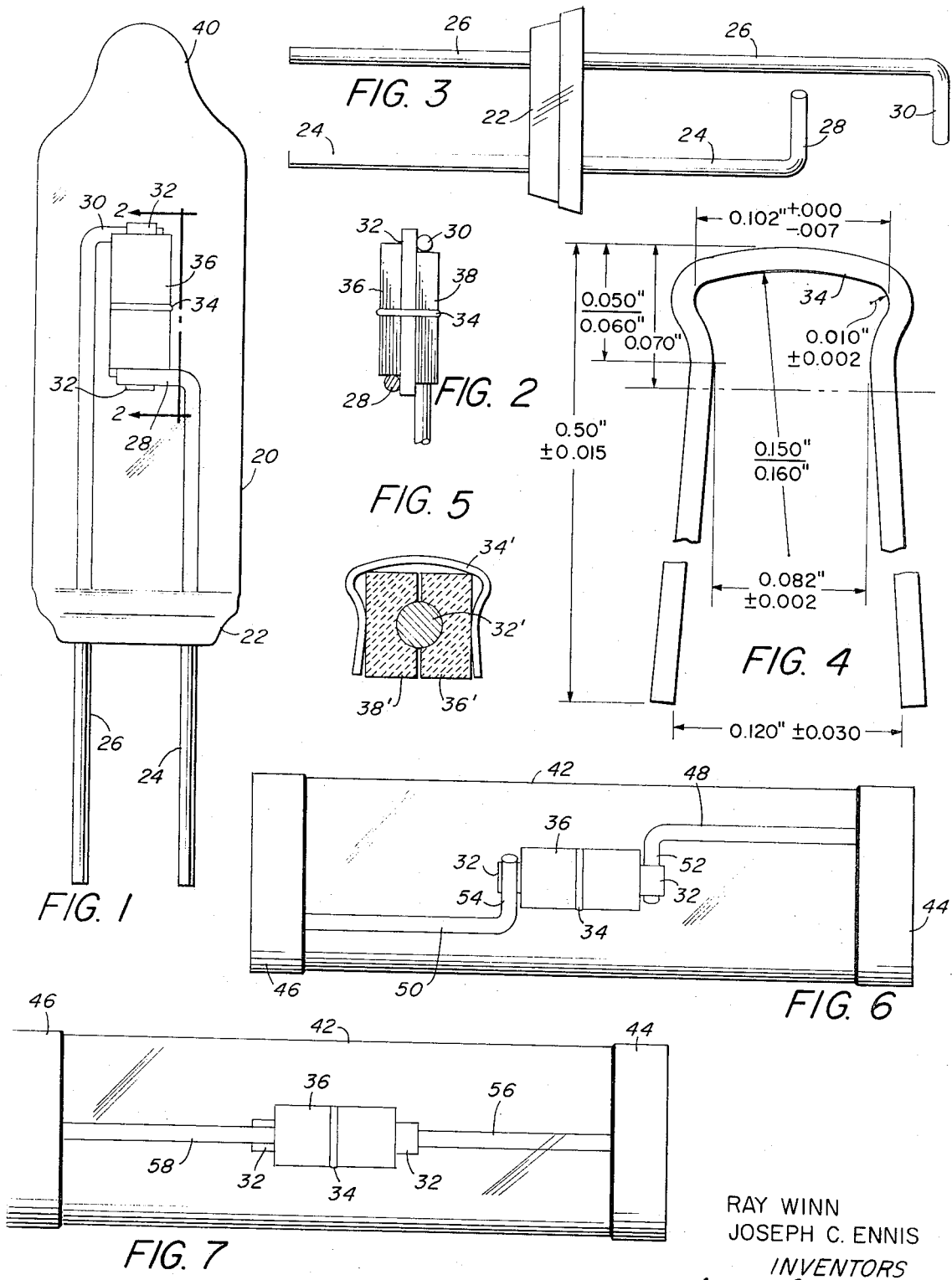

THERMOLUMINESCENT RADIATION DETECTOR

BACKGROUND

The present invention relates to apparatus for measuring ionizing radiation, and more particularly, to an improved thermoluminescent radiation detector.

Exposure to ionizing radiation, such as x-rays, gamma rays, cosmic rays, and nuclear radiation generally, constitutes a serious hazard to human beings. Moreove, activities involving exposure to ionizing radiation are increasing. For example, medical and dental practitioners expose their patients and themselves to x-rays and gamma ray radiation while performing a variety of diagnostic and therapeutic procedures. Nuclear fission atomic power plants, both stationary and mobile, produce biologically harmful radiations during operation. Moreover, their by-products are intensely radioactive materials which must be handled, processed, stored and transported. Concentrated radioactive isotopes find increasing uses in industry and in research laboratories. Military nuclear weapons, upon detonation, disperse immense quantities of radioactive material into the atmosphere which may fall on populated centers. In space exploration, manned vehicles pass through regions of intense ionizing radiation which expose the vehicles and their occupants to cosmic radiation generally. Thus, many people are being exposed to biologically harmful radiation. To avoid excessive dosage, such persons must monitor the total radiation which their bodies receive. In addition, there are numerous other requirements in industry and in research laboratories for monitoring radiation with high reliability. To do this, a variety of instruments, such as ionizing chambers, Geiger counters, scintillation detectors, and others, are used. These require power to operate, and have other disadvantages insofar as personnel radiation monitoring is concerned. Heretofore, passive or non-powered dosimeters, which integrate or sum the total incident radiation, have proven most useful for personnel monitoring. Most widely used are the small pocket-sized electroscope and the photographic film badge.

The photographic film badge dosimeter requires considerable processing after exposure to develop the film and to translate the developed film into units of radiation dosage. Then it is reloaded with fresh unexposed film before it is used again. Photographic film badge dosimeters are reliable through the dosage range in which they are sensitive; however, they lack as wide a dosage range as is desirable. Also, they lack close tolerance and quantitative reproducibility. Further, processing for readout is too complicated to be practical in field or disaster environments. Thus, there are good reasons for replacing the photographic film badge dosimeter.

Another pocket-sized, easily read dosimeter utilizes the electroscope. These are easy to charge and to calibrate under field conditions and are conveniently read visually. However, they are highly sensitive to mechanical shock and rough handling, both of which cause loss of calibration. Therefore, their reliability is always questionable. They do have the advantage of not requiring complex processes for readout and reloading prior to reuse, but may be read out visually and recalibrated by very simple means.

Thus, the need exists for a highly reliable radiation dosimeter which may be used over and over again without additional reloading, complex processing, or calibration. Such a dosimeter must have a very high reliability and good accuracy under the most severe of field conditions or disaster environments. This need has led to serious and expensive efforts to adapt the phenomenon of thermoluminescence to personnel radiation dosimetry.

Thermoluminescence is a phenomenon observed in a number of materials, some of which occur naturally, in which electrons are sufficently excited by impinging ionizing radiation to undergo transitions to certain metastable states or traps. From there they may be excited by heat energy to undergo further transitions to emitting states from which they experience optical transitions back to the ground state, emitting visible light during these latter transitions.

Thermoluminescent materials can now be prepared which exhibit good reproducibility in their response to radiation dosage. Further, they may be exposed repeatedly, even hundreds of times, to radiation, each radiation exposure being quantitatively impressed upon the material and they may be quantitatively read out upon heating between each exposure. Despite extensive reuse, the response of such samples of thermoluminescent materials to ionizing radiation remains unchanged.

To determine the amount of exposure, the thermoluminescent material is heated up to about 300° C during which it luminesces. The recording of luminescent brightness versus temperature taken at a constant heating rate is called the "glow curve." The number of different types of traps in the material and the energy by which the electrons are bound in these traps determine the number of peaks in the "glow curve" and the temperature at such peaks. With shallow traps (less binding energy) moderate ambient temperatures release the trapped electrons and visible photons. The deeper the trap, the higher is the glow peak temperature, and the more stable is the thermoluminescent signal of the phosphor at ambient temperatures. The thermoluminescent brightness for a given exposure depends on the concentration of trapping sites (quantum efficiency) and on the efficiency of the transitions back to the ground state. The rate of heating the phosphor also affects the glow curve, although the total light emitted is the same regardless of heating rate. Faster heating gives narrower glow curves of higher peak brightness and shifts the peak emission to higher temperatures.

When used in a personnel dosimeter the thermoluminescent detector is enclosed in a radiation shield to achieve uniformity of response to ionizing radiations of various energies. During readout light sensitive apparatus detects the luminescent output of the thermoluminescent material during the heating process and converts it to an electrical signal. Recording apparatus may be utilized to record the entire glow curve, including the peaks. Either the area under the glow curve or a portion thereof, or the brightness of emitted light at the maximum glow peak constitutes a measure of ionizing radiation dosage. Alternatively, the maximum glow peak may be measured electronically and converted to units of radiation dosage. The application of heat after the readout process restores the thermoluminescent material to its original unirradiated condition releasing all the trapped electrons. Upon cooling, it is again in condition to register new ionizing radiation exposures. Thermoluminescent materials adaptable to dosimetry must have deep electron traps from which electrons and visible photons are not emitted at normal ambient temperatures. Any material having an appreciable number of shallow and intermediate depth traps, which are depopulated at ambient and moderately elevated temperatures with the passage of time, precludes its use for dosimetry.

Earlier endeavours to construct practical personnel radiation dosimeters with thermoluminescent phosphor material were not successful because their detectors were insensitive to low dosage rates, or were unstable and released trapped electrons spontaneously at ambient temperatures with the passage of time. Continued efforts to develop thermoluminescent materials suitable for dosimetry resulted in the production of manganese-activated calcium fluoride, which contains deep traps almost exclusively. One serious disadvantage of the manganese-activated calcium fluoride is its undesirable chemical activity during processing. Other deep-trap thermoluminescent materials occur in nature in limited quantities and can be manufactured. These include lithium fluoride, calcium sulphate, and some organic materials.

Various schemes have been devised and proposed for the use of thermoluminescent materials in practical personnel dosimeters. One early device utilized only the glow peaks of "thresholds" of various thermoluminescent materials confined within a glass container. No effort was made to read the total radiation quantitatively, but the radiation dosage was estimated to be between that minimum dosage that would produce luminescence in the highest "threshold" material that luminesced and below that of the next higher threshold material that did not luminesce. Obviously, this device was not a practical dosimeter because it could not accurately measure radiation dosage.

A later endeavour included dosimeters prepared by mixing thermoluminescent powder with temperature resistant transparent cementing materials such as a mixture containing potassium silicate and then coating the mixture onto heating elements enclosed within a glass tube in an inert gaseous environment of low thermal conductivity. Dosimeters constructed in this manner give reliable readings for dosages as low as 50 mr. with little or no spurious luminescent effects. One difficulty encountered with this latter technique of mounting the phosphor is that repeated heating to temperatures in excess of 30° C during readout caused scaling and breaking up of the thermoluminescent coatings. Another difficulty is that potassium silicate in cementing mixtures is naturally radioactive and that dosimeters containing the same naturally accumulate dosage at the rate of about 0.4 milliroentgen per day. This is objectionable in some applications.

Another scheme contemplates compressing thermoluminescent phosphor powder consisting of a mixture of relatively large and small granular sizes, within a container having a transparent wall. Only sufficient compression is utilized to avoid relative motion of the powder granules with respect to each other and with respect to the container walls. This is done to avoid spurious thermoluminescence of various kinds.

In still another scheme the electrical heating element threads through the coaxial hole passing through a cylindrically-shaped, hot-pressed thermoluminescent member of predetermined length. A glass envelope encloses this assembly in a gaseous environment of high thermal conductivity. A major difficulty with this scheme resides in the manufacturing of the cylindrically-shaped, hot-pressed thermoluminescent members. No efficient way has been found to hot-press these members to the dimensions desired in manufacturing quantities. Thus, conventional ultrasonic drill presses using specially designed steel cutters are used to cut these members from base pieces of hot-pressed thermoluminescent material. Obviously, a large amount of this material is wasted. Worse, the rejection rate of thermoluminescent members produced by this ultrosonic means is totally unacceptable in a manufacturing process. A second major difficult occurs during readout. Air gaps between the heater wire and the thermoluminescent member prevent good, uniform heat conduction therebetween. Use of a sealing material between the heater wire and the thermoluminescent member does little to improve heat conduction. Consequently, during heating, certain points on the heater wire become hotter than others. These points are commonly called "hot spots." These hot spots may radiate light in the visible spectrum or infrared radiation. The result is that such a detector produces a slightly erroneous reading at low radiation dosages. For example, if an unirradiated detector of this type is passed through a heating cycle, it exhibits about a 0.5 mr equivalent dose. This is unacceptable in low dosage radiation dosimetry.

Moreover, these schemes do not provide an inexpensive, practical, sensitive, mechanically rugged dosimeter.

Deep-trap thermoluminescent materials, sensitive to radiation in the milliroentgen range, may be prepared in the laboratory. These materials have a further advantage of being linear in their response to radiation through as much as seven decades of radiation dosage. The desirability of adapting these thermoluminescent materials to personnel radiation dosimeters is clear. There remained the practical problem solved by the present invention of providing a thermoluminescent radiation detector which is sensitive to very small radiation dosage, which may be used over and over after repeated readout, and which will be inexpensive to manufacture.

The present invention involves a unique thermoluminescent radiation detector utilizing hot-pressed thermoluminescent materials made according to the process described in application Ser. No. 432,804 filed Feb. 15, 1965, now U.S. Pat. No. 3,567,922 by Gerald E. Blair and assigned to the same assignee as the present invention.

OBJECTS

Accordingly, one object of this invention is to provide an improved an improved thermoluminescent radiation detector.

Another object of this invention is to provide an inexpensive, sensitive, and reliable thermoluminescent radiation detector which may be accurately reproduced in great quantity.

Another object of the present invention is to eliminate any binders that may contain naturally radioactive materials, thus preventing natural accumulation of dosage.

In one type of prior art thermoluminescent radiation detector the manufacturing rejection rate averaged about 50 percent in order to produce detectors having an acceptable sensitivity of ± 20 percent. Thus, still another object is to provide a thermoluminescent radiation detector in which the manufacturing rejection rate is greatly reduced and the sensitivity is held to within ± 5 percent of the mean sensitivity.

Still another object is to provide a thermoluminescent radiation detector having a precision in reading that is better than 1 percent after being subjected to various radiation dosages.

A further object is to produce a thermoluminescent radiation detector which the manufacturer can guarantee will withstand at least 1,000 heat cycles without degradation of performance.

In one type of prior art thermoluminescent radiation detector, the thermoluminescent material was enclosed in an inert environment of low thermal conductivity or in an evacuated chamber. It was believed that this completely suppressed spurious luminescence thus providing a threshold of practical detection of radiation dose in the low milliroentgen range. In particular, it was believed that the constituents of air — oxygen, nitrogen and carbon dioxide — gave rise to spurious luminescence, thus preventing reliable detection of radiation doses in the milliroentgen range. It has been discovered that this is not so. Consequently, it is still another object of the present invention to provide a thermoluminescent radiation detector of superior operating characteristics in which the thermoluminescent material is enclosed in gaseous environments of high thermal conductivity such as helium or gaseous environments of carbon dioxide.

Other objects and various further features of novelty and invention will be pointed out or will occur to those skilled in the art from a reading of the following specification and claims.

DESCRIPTION OF THE DRAWINGS

The invention is more easily described by referring to the following illustrations in which:

FIG. 1 is a side view of one embodiment of the present invention;

FIG. 2 is a view showing construction of part of the embodiment of FIG. 1;

FIG. 3 illustrates the electrical leads mounted in the base of the embodiment of FIG. 1;

FIG. 4 illustrates the spring clip utilized to maintain thermoluminescent chips in contact with the heater element;

FIG. 5 is a sectional view showing construction of an embodiment alternative to the sub-assembly of FIG. 2; and FIGS. 6 and 7 illustrate still other embodiments of the present invention.

DETAILED DESCRIPTION

In U. S. Pat. No. 3,282,855, issued Nov. 1, 1966 to R. C. Palmer et al. for "Method of Making Thermoluminescent Manganese-Activated Calcium Fluoride" and assigned to the assignee of the present invention, the patentees disclose a method of making manganese-activated calcium fluoride. The method comprises mixing an aqueous slurry of calcium carbonate and 1 to 10 mole percent of manganous carbonate with a concentrated solution of hydrofluoric acid. The reaction is quite vigorous and after 2 or 3 minutes a coprecipitate of calcium fluoride and manganous fluoride forms. When the coprecipitate ceases forming, it is washed 3 or 4 times with either deionized or distilled water to remove all hydrofluoric acid and by-products of the reaction. It is then dried at about 95° C, producing a powdered mixture of calcium fluoride and manganous fluoride. At this stage the coprecipitate is not useful as a thermoluminescent material because it is only slightly thermoluminescent. The powdered coprecipitate is then placed in a platinum crucible and heated in a dry inert atmosphere for 30 minutes at a temperature of about 1,200° C. During this heating the coprecipitate becomes a cake of manganese-activated calcium fluoride which is highly thermoluminescent. After cooling, the cake may be broken up and pulverized into a powder for use in manufacturing thermoluminescent dosimeters. The latter step of heating at 1,200° C is called "activating" because it is believed that such heating forces many more manganese ions into the crystal lattice of the calcium fluoride creating many more deep traps thereby making the material highly thermoluminescent. The above identified patent to Blair discloses that the 1,200° C heating step and the additional detector manufacturing steps of coating some substance with manganese-activated calcium fluoride may be omitted and that hot-pressing techniques may be utilized to concurrently activate and form the coprecipitated calcium fluoride and manganous fluoride into a solid, activated thermoluminescent material.

FIRST EMBODIMENT

Referring to FIGS. 1 through 4, one embodiment of the present invention comprises transparent glass envelope 20 that may be sealed to base 22 by known techniques. Heater current leads 24 and 26 pass through base 22 and are sealed thereto. Leads 24 and 26 are bent to form arms 28 and 30 respectively. Ribbon heater wire 32 is spot welded to arms 28 and 30. Spring clip 34 maintains chips 36 and 38 in surface to surface contact with heater ribbon wire 32. Chips 36 and 38 are hot-pressed thermoluminescent material such as, for example, manganese-activated calcium fluoride or lithium fluoride. After assembly, glass envelope 20 may be evacuated to maintain the assembly in vacuum or it may be filled with a gas of high thermal conductivity, prior to sealing at tip 40.

Referring now to FIG. 2, during assembly, arms 28 and 30 are pulled slightly together and ribbon heater wire 32 is stretched taut when spot welding ribbon heater wire 32 to arms 28 and 30. This assures that ribbon heater wire 32 does not wrinkle or buckle when heated by heater current during readout of radiation doses received by the detector. Chips 36 and 38 may be made on a semi-conductor wafering machine from a cake of hot pressed thermoluminescent manganese-activated calcium fluoride or from hot-pressed lithium fluoride. Such lithium may be $Li_6$, $Li_7$ or natural lithium. Typically, chips 36 and 38 have dimensions one-fourth inch long by 0.070 inch wide by 0.035 inch thick. Ribbon heater wire 32 may be Stablohm 650 ribbon wire with typical dimensions 0.045 inch long by 0.375 inch wide by 0.0035 inch thick. It will be understood that ribbon heater wire 32 may be cut to the length desired to produce the heating desired.

With the above typical dimensions spring clip 34 originally has the typical dimensions illustrated in FIG. 5 and may be made of 0.016 inch diameter NISPAN C. During assembly of the above-described embodiment it is cut to a length of approximately 0.070 inch. Spring clip 34 typically exerts about 5 lbs. force on chips 36 and 38, forcing them to maintain surface to surface contact with ribbon heater wire 32. This represents a pressure of about 285 psi.

Note that spring clip 34 is located midway between arms 28 and 30. This helps to provide uniform temperature during heating over the length of chips 36 and 38, as will now be explained. When making a reading electric current flows through ribbon heater wire 32 causing its temperature and the temperature of chips 36 and 38 to rise. Arms 28 and 30, however, act as heat sinks. Thus, a temperature profile would show lower temperatures in the vicinity of arms 28 and 30 than midway between them. Spring clip 34 located midway between arms 28 and 30 also acts as a heat sink lowering the temperature of chips 36 and 38 at the midway point. Thus, more uniform temperatures are achieved over the lengths of chips 36 and 38.

Referring to FIGS. 1 and 2, note that chip 36 abuts arm 28 and completely masks one side of the current-carrying portion of ribbon heater wire 32. Similarly, chip 38 abuts arm 30 and completely masks the other side of the current-carrying portion of ribbon heater wire 32. This construction forces light produced at possible hot spots on ribbon heater wire 32 to pass through chips 36 or 38. More importantly, though, it assures that the heat-producing surfaces of ribbon heater wire 32 are in surface to surface contact with chips 36 and 38, thus providing highly efficient heat conduction therebetwen. As a result, this configuration has about a 0.05 mr infrared equivalent dose.

A high thermal conductivity gas within envelope 20 provides more efficient heat conduction between chips 36 and 38 and the heat sinks represented by clip 34, and arms 28 and 30 to the exterior environment. This helps to avoid incandescence of chips 36 and 38 before the glow peak is read.

Chips 36 and 38 are so thin that they are almost transparent. This means that the thermoluminescent glow produced within the body of each chip 36 and 38 is efficiently transmitted optically to the exterior of each chip. Stated grossly, the glow produced throughout the chip is seen by the light sensitive detector during readout. Thus, the sensitivity of this detector is better by a factor of five than the prior art detector which utilized a mixture of thermoluminescent powder and potassium silicate coated onto a heating element.

FIG. 5 illustrates an embodiment alternative to the sub-assembly of FIG. 2. In this embodiment heater wire 32' has a circular cross-section, and, as in the foregoing description, is stretched taut while being spot welded to arms 28 and 30. Chips 36' and 38' have semicircular grooves cut in them so they fit snugly around the cylindrical exterior surface of heater wire 32' under pressure provided by spring clip 34'.

The configurations illustrated in FIGS. 6 and 7 are very similar in appearance to link fuses and are designed to fit into a clip-in fuse holder in readout apparatus. In both embodiments glass envelope 42 is sealed to end cap terminals 44 and 46 by conventional techniques. In both cases, envelope 42 encloses the detector assembly either in vacuum or in a high thermal conductivity gas. Both configurations may utilize the sub-assembly of FIG. 5 (not shown).

In FIG. 6, electrical leads 48 and 50 extend from end cap terminals 44 and 46, respectively, and provide mechanical rigidity for the detector assembly. Electrical leads 48 and 50 are bent to form arms 52 and 54 as in FIG. 1. Ribbon heater wire 32 is spot welded to arms 52 and 54, again, as in FIG. 1. As illustrated, chips 36 and 38 and spring 34 are assembled as in FIG. 1.

In the embodiment of FIG. 7, electrical leads 56 and 58 extend axially from end cap terminals 44 and 46. During assembly ribbon heater wire 32 is stretched taut and spot welded to electrical leads 56 and 58. Chips 36, 38 and spring clip 34 are assembled on ribbon heater wire 32 as hereinbefore described.

In the embodiments of the invention herein disclosed, it has been found that no spurious luminescence occurs during measurement of an irradiated detector. A high thermal conductivity gaseous environment, or an environment of carbon dioxide, contributes to the sensitivity of the detectors described. Moreover, the detectors described are inexpensive to manufacture and are thoroughly reliable. Through the use of flat chips, the manufacturing rejection rate of thermoluminescent members has been minimized. Further, for manufacturing purposes, the detectors described can be guaranteed to withstand 1,000 heat cycles without degradation of performance.

Further modifications will occur to those skilled in the art and all such are considered to fall within the spirit and scope of the invention as defined in the appended claims

We claim:

1. A radiation detector comprising:
   a heater wire;
   first and second chips of thermoluminescent material disposed on opposite sides of the heater wire and in surface contact with the exterior surface of the heater wire;
   a spring disposed around the chips of thermoluminescent material to hold them in surface-to-surface contact with the exterior surface of the heater wire and act as heat sink means to more evenly distribute heat along the length of the chips;
   a transparent envelope enclosing the heater wire, chips and spring; and
   electrical leads connected to the ends of the heater wire providing mechanical rigidity and passing through the envelope.

2. A radiation detector as in claim 1, in which the envelope is evacuated to provide a vacuum around the chips.

3. A radiation detector as in claim 1, in which the envelope also encloses a gaseous environment of high thermal conductivity.

4. A radiation detector as in claim 1, in which the envelope encloses a gaseous environment of carbon dioxide.

5. A radiation detector as in claim 1 in which the envelope encloses a gaseous environment of air.

6. A radiation detector as in claim 1 in which the chips are hot-pressed thermoluminescent material selected from fluorides of the group consisting of $Li_6$, $Li_7$ and natural lithium.

7. A radiation detector as in claim 1 in which the chips are made of hot-pressed manganese-activated calcium fluoride.

8. A radiation detector as in claim 1 in which the heater wire has a circular cross section.

9. A radiation detecor as in claim 8 in which the chips have semicircular grooves cut in them.

10. A radiation detector as in claim 1 in which the heater wire is a ribbon heater wire.

11. A radiation detector as in claim 1 wherein the heater wire is stretched taut between the electrical leads to prevent it from wrinkling and buckling during readout.

12. A radiation detector as in claim 1 including first and second end caps sealed to opposite ends of the detector, and wherein said electrical leads comprise a first lead which connects to said first end cap and a second lead which connects to said second end cap.

13. A radiation detector as in claim 1 wherein said electrical leads provide further heat sinks at the ends of the heater wire.

14. The radiation detector of claim 1 wherein said spring is located at approximately the midpoint of the length of the chips.

15. The radiation detector of claim 18 wherein the heater wire is stretched taut between the electrical leads to prevent it from wrinkling and buckling.

16. The radiation detector of claim 1 including first and second end caps sealed to opposite ends of the detector, and wherein said electrical leads comprise a first lead which connects to said first end cap and a second lead which connects to said second end cap.

* * * * *

UNITED STATES PATENT OFFICE
CERTIFICATE OF CORRECTION

Patent No. 3,775,614              Dated  November 27, 1973

Inventor(s) Ray Winn and Joseph C. Ennis

It is certified that error appears in the above-identified patent and that said Letters Patent are hereby corrected as shown below:

In Column 10, line 4 of the printed patent (patent claim 15)

change "18" to -- 14 --

Signed and sealed this 21st day of May 1974.

(SEAL)
Attest:

EDWARD M. FLETCHER, JR.                C. MARSHALL DANN
Attesting Officer                       Commissioner of Patents